United States Patent [19]

Kawakami et al.

[11] Patent Number: 5,107,395
[45] Date of Patent: Apr. 21, 1992

[54] METHOD OF PRODUCING INSULATING OIL COMPRISING DIBENZYLBENZENE

[75] Inventors: Shigenobu Kawakami, Ichikawa; Keiji Endo; Hideyuki Dohi, both of Yokohama; Atsushi Sato, Tokyo, all of Japan

[73] Assignee: Nippon Petrochemicals Company, Limited, Tokyo, Japan

[21] Appl. No.: 601,797

[22] PCT Filed: Mar. 7, 1990

[86] PCT No.: PCT/JP90/00295
§ 371 Date: Jan. 7, 1991
§ 102(e) Date: Jan. 7, 1991

[87] PCT Pub. No.: WO90/10686
PCT Pub. Date: Sep. 20, 1990

[30] Foreign Application Priority Data

Mar. 7, 1989 [JP] Japan .................................. 1-54144

[51] Int. Cl.$^5$ ............................ H01G 4/22; H01B 3/24
[52] U.S. Cl. ..................................... 361/315; 174/25 C
[58] Field of Search ............... 361/327, 314, 315, 323; 585/6.3, 24, 25; 252/567; 174/25 C

[56] References Cited

U.S. PATENT DOCUMENTS 3,481,997 12/1969 Vanderwerff ...................... 260/670
4,568,793 2/1986 Sato et al. ........................ 174/25 C

FOREIGN PATENT DOCUMENTS 48-95599 12/1973 Japan .
49-14320 2/1974 Japan .
49-41634 4/1974 Japan .
49-135199 12/1974 Japan .
61-51704 3/1986 Japan .
1579679 11/1980 United Kingdom .

Primary Examiner—Donald A. Griffin
Attorney, Agent, or Firm—Scully, Scott, Murphy & Presser

[57] ABSTRACT

An insulating oil comprising dibenzylbenzenes which is most suitably used for impregnating a metallized plastic film capacitor, is produced by the reaction of benzene or toluene with diphenylmethane or a methyl derivative thereof at 170° C. to 400° C. in the presence of a synthetic crystalline zeolite catalyst having a molar ratio of $SiO_2$ to $Al_2O_3$ of 20 or above, wherein the inlets of main pores are constituted of ten-membered oxygen rings.

11 Claims, No Drawings

METHOD OF PRODUCING INSULATING OIL COMPRISING DIBENZYLBENZENE

DESCRIPTION

1. Technical Field

This invention relates to a method of producing an electrical insulating oil comprising dibenzylbenzenes. The insulating oil prepared according to the present invention is suitably used for oil-filled electrical appliances in which at least a part of insulating material of dielectric material is made of a plastic film. It is used more preferably for oil-filled capacitors, especially suitable for oil-filled metallized plastic film capacitors.

2. Background Art

The reduction of sizes and weights of oil-filled capacitors and oil-filled cables are recently eagerly required. In order to comply with the requirement, the insulating materials or dielectric materials are, at least partially, made of plastics, for example, polyolefin such as polypropylene.

In spite of the attempt to improve the structure itself of oil-filled electrical appliances, there is no satisfactory improvement in the electrical insulating oil to be used for impregnation. In other words, for example, the conventional insulating oils such as refined mineral oils, polybutenes, alkylbenzenes, diarylalkanes, alkylbiphenyls and alkylnaphthalenes are not always satisfactory in view of their properties and characteristics. Under the existing circumstances, there are few electrical insulating oils which are suitable for the oil-filled electrical appliances such as oil-filled capacitors, especially metallized-film capacitors (hereinafter referred to as "MF capacitor") in which a metallized film made by depositing a metal such as aluminum is wound as an electrode and an electrical insulating oil is impregnated.

That is, presently used MF capacitors are mainly the so-called dry-type MF capacitors which are not impregnated with an electrically insulating material such as insulating oil. In capacitors as well as in other electrical appliances, the potential gradient is generally high when an electrically insulating material exists around electrodes or conductors. Accordingly, the voltage-withstanding property of an impregnated MF capacitor is higher than that of a dry-type capacitor and the former capacitor can comply with the requirements for reducing the sizes and weights of capacitors. Nevertheless, the metallized film using a plastic base film such as polypropylene film receives a large influence of oil impregnation. For example, the size of base film is changed by oil impregnation and even when impregnation oil slightly permeates between a deposited metal layer and a base film, deposited metal layer is creacked, and what is worse, the deposited metal film is often peeled off, which results into dielectric breakdown. Accordingly, the electrical insulating oil suitable for MF capacitors is few.

For example, in an MF capacitor which is impregnated with benzyltoluene or phenylxylylethane, the capacity is lowered severely in use and the corona (partial) discharge characteristic is not always good.

DISCLOSURE OF THE INVENTION

The present invention relates to a method for producing electrical insulating oil which is characterized in that benzene or toluene is reacted with diphenylmethane or its derivative at a reaction temperature of 170° to 400° in the presence of a synthetic crystalline zeolite catalyst having a molar ratio of $SiO_2$ to $Al_2O_3$ of 20 or above, wherein the inlets of main pores are constituted of ten-membered oxygen rings.

The present invention will be described in more detail in the following.

A method to produce xylene by the disproportionation between toluene molecules in the presence of ZSM-5 type zeolite catalyst (British Patent No. 1,463,359). This is naturally accomplished by transfer of methyl groups.

When dibenzylbenzene is produced from toluene and diphenylmethane using ZSM-5 type zeolite, assuming that the transfer of methyl group is caused to occur, the formation of xylene is naturally presumed because toluene exists. If xylene is produced, it is not desirable because the yield of dibenzylbenzene is lowered owing to the consumption of toluene. Therefore, it was presumed that ZSM-5 type catalyst was not suitable for producing dibenzylbenzene from toluene and diphenylmethane.

Contrary to the presumption, however, the present inventors have found out that, despite the existence of toluene, the reaction to produce dibenzylbenzene proceeds substantially without the formation of xylene. Furthermore, in addition to dibenzylbenzene, other methyl nuclear substitution compounds such as methyl and dimethyl derivatives are produced much.

Accordingly, it is a remarkable fact that xylene is not produced and more dibenzylbenzenes are produced in the method of the present invention, which fact has been by no means anticipated in view of the description in the foregoing patent gazette.

One of the starting materials used in the method of the present invention is benzene or toluene. These can be used in a mixture.

The other starting material is diphenylmethane or its methyl derivative. The methyl derivative is namely benzyltoluene or ditolylmethane. These diphenylmethane, benzyltoluene and ditolylmethane can be used in a mixture.

Included in the dibenzylbenzenes prepared according to the method of the present invention are dibenzylbenzene as well as its monomethyl nuclear substitution compounds such as dibenzyltoluene and its dimethyl nuclear substitution compounds such as dibenzylxylene.

The conditions for the reaction of benzene or toluene with diphenylmethane in the present invention are as follows:

In the first place, the catalyst is a crystalline synthetic aluminosilicate zeolite of 20 or higher in molar ratio of $SiO_2/Al_2O_3$ and the inlets of main pores thereof are composed of ten-membered oxygen rings. Such a zeolite is exemplified by ZSM-5 type synthetic zeolite having the inlets of main pores composed of ten-membered oxygen rings as well as zeolite zeta 1 and zeolite zeta 2. That is, the zeolite used in the present invention is characterized in that the inlets of main pores are composed of ten-membered oxygen rings. Conventional synthetic zeolites such as zeolite A, erionite and offretite have smaller inlets of eight-membered oxygen rings. Meanwhile, mordenite, zeolite X and zeolite Y have larger inlets of twelve-membered oxygen rings.

These conventional zeolites having eight-membered oxygen rings or twelve-membered oxygen rings are not suitable for use in the method of the present invention because the structure of them are different from that of the present invention.

Any of crystalline synthetic aluminosilicates as far as they are 20 or higher in molar ratio of $SiO_2/Al_2O_3$ and the inlets of main pores thereof are composed of ten-membered oxygen rings, can be used as the crystalline synthetic zeolite in the present invention. Especially preferable ones are ZSM-5 type synthetic zeolites known as ZSM-5, ZSM-11, ZSM-12, ZSM-22, ZSM-23, ZSM-35, ZSM-38 and ZSM-48. All of these ZSM-5 type synthetic zeolites have the structural characteristic that the inlets of main pores are composed of ten-membered oxygen rings. Furthermore, most preferable synthetic zeolite is ZSM-5. The compositions and methods for preparing these ZSM-5 type zeolites are disclosed in the following patent gazettes.

ZSM-5: U.S. Pat. No. 3,702,886 British Patent No. 1,161,974 and Japanese Patent Pub. No. 46-10064

ZSM-8: British Patent No. 1,334,243

ZSM-11: U.S. Pat. No. 3,709,979 and Japanese Patent Pub. No. 53-23280

ZSM-21: U.S. Pat. No. 4,001,346

ZSM-35: Japanese Laid-Open Patent Publication No. 53-144500

Zeolite Zeta 1: Japanese Laid-Open Patent Publication No. 51-67299

Zeolite Zeta 3: Japanese Laid-Open Patent Publication No. 51-67298

The synthetic zeolite having the structural characteristic that the inlets of main pores are composed of ten-membered oxygen rings, has usually a high molar ratio of $SiO_2/Al_2O_3$ and the value is generally 20 or higher. In some case, the molar ratio of $SiO_2/Al_2O_3$ is very high, for example, the synthetic zeolite having a molar ratio as high as 1,600 can be effective. Furthermore, in some case, it is possible to use a zeolite of substantially no aluminum having a value close to infinity in the molar ratio of $SiO_2/Al_2O_3$. Such a "high-silica" zeolite is also included in the definition in the present invention. This molar ratio of $SiO_2/Al_2O_3$ can be determined by an ordinary analytical method such as atomic absorption spectrum analysis. This ratio is defined as the value to be close as possible to the ratio in the hard skeleton of zeolite crystal but the aluminum in cation form or other forms contained in binder or channels is excluded.

The structure of ten-membered rings in the inlets of main pores usually confirmed by X-ray diffractiometry. For example, the ZSM-5 type synthetic zeolites which are preferably used as catalysts in the present invention exhibit characteristic X-ray diffraction patterns particular to them (cf: the foregoing patent gazettes in detail).

It is, however, possible to employ the values of constraint indexes in place of the X-ray diffractiometry. That is, the ten-membered oxygen ring referred to in the present invention can also be defined as the synthetic zeolites having constraint indexes of 1 to 12. By the way, the practical determination method of the constraint index is described in Japanese Laid-Open Patent Publication No. 56-133223. This index shows the degree to which the pore structure of zeolite crystal restrains the access of molecules having a cross sectional area larger than that of n-paraffin. In the determination, as disclosed in the same reference, n-hexane and 3-methylpentane are adsorbed by zeolite under a certain condition and the index is calculated from adsorbed quantities. Typical values of the constraint indexes are as follows:

|  | Constraint Index |
|---|---|
| ZSM-5 | 8.3 |
| ZSM-11 | 8.7 |
| ZSM-35 | 4.5 |
| Amorphous Silica-Alumina | 0.6 |

The method for preparing the zeolite used in the present invention will be described with reference to the synthesis of ZSM-5.

In the first place, a starting mixture containing tetrapropylammonium hydroxide, sodium oxide, aluminum oxide, silicon oxide and water, is prepared. The composition may be made within the range as described in the foregoing reference. The reaction mixture is then subjected to hydrothermal synthesis by heating. After the synthesis, the obtained crystal is baked in the air to obtain ZSM-5 zeolite catalyst. Tetrapropylammonium hydroxide can be synthesized in situ from n-propylamine and n-propyl bromide. Aluminum oxide is used herein, however, it is also proposed to synthesize ZSM-5 containing substantially no aluminum atom. In the above method, tetrapropylammonium hydroxide is used, however, it is also proposed as the method for synthesizing ZSM-5 to use several other organic cations or organic compounds as their precursors in place of them. Such compounds are exemplified by ammonia, trialkylmethylammonium cation, triethyl-n-propylammonium cation, $C_2$ to $C_9$ primary monoalkylamines, neopentylamine, di- and trialkylamines, alkanolamines, $C_5$ to $C_6$ alkyldiamines, $C_3$ to $C_{12}$ alkylenediamines, ethylenediamine, hexamethylenediamine, $C_3$ to $C_6$ diols, ethylene or propylene glycol, pentaerythritol, dipentaerythritol, tripentaerythritol, 1,4-dimethoxycyclohexane, hydroquinone, ethylene oxide and ammonia, n-dodecylbenzene sulfonate, cyclopentadienyl phthalocyanine complex, 2-aminopyridine, ethylene glycol dimethyl ether, dioxane, dioxolan, tetrahydrofuran, and carboxylic acids such as tartaric acid. Furthermore, it is also proposed that, without adding organic cations or organic compounds as precursors thereof as described above, ZSM-5 is added as seeds in crystallization.

The zeolite used for the reaction contains metallic ions such as sodium ions which come from the reaction materials in synthesis. Besides the sodium as an alkali metal, it is possible to use the one which is ion exchanged by other alkaline earth metals such as calcium and magnesium and other trivalent metallic ions. Furthermore, crystalline synthetic aluminosilicate zeolite such as ZSM-5 type zeolite which is modified with boron, potassium, phosphorus or their compounds, can also be used. The methods for these ion exchange and modification can be carried out by a conventional method.

As described above, the crystalline synthetic zeolite of the present invention can contain various kinds of metals, however, the synthetic zeolite which is desirable for the method of the present invention is the so-called hydrogen-type zeolite in which the metallic ions are substituted with hydrogen ion. Typical hydrogen-type zeolite is prepared by a process such that the catalyst containing the organic cations used in the catalyst preparation is heated for instance at 400° to 700° C. for 1 hour in inert atmosphere and it is then subjected to ion exchange with an ammonium salt or a mineral acid such as hydrochloric acid, and it is further calcined, for example, at 300° to 600° C. to be activated, thereby obtaining the catalyst what is called hydrogen-type zeolite.

The reaction temperature in the present invention is 170° to 400° C., preferably 200° to 350° C.

When the reaction temperature is lower than the above range, the rate of conversion of starting material is low. On the contrary, the temperature above this range is not desirable because a side reaction such as the formation of xylene is caused to occur.

Even though the reaction can be carried out in vapor phase, however, the liquid phase is desirable in order to maintain the life of catalyst long. Furthermore, the vapor phase reaction must be done naturally at higher temperatures and when the reaction temperature is high, the side reaction such as the formation of xylene is liable to occur as described above. Accordingly, the reaction is carried out in liquid phase.

In order to carry out the reaction in liquid phase, it is desirable that the reaction pressure must be set at a suitable value in which the reaction system is maintained in liquid phase. This pressure is generally selected from the range of normal pressure to 50 kg/cm$^2$.

The type of reaction in the method of the present invention may be either of continuous flow mode or batchwise mode. In batchwise reaction, the reaction time is selected from the range of 0.5 to 50 hours, which varies according to reaction temperature and other reaction conditions. If the reaction time is shorter than this range, the rate of conversion is low. On the other hand, when the reaction time is made unnecessarily long, it is not desirable because the yield of dibenzylbenzene cannot be raised any more and it rather causes the side reactions.

When the type of reaction is continuous flow mode, the value of LHSV is 0.2 to 20, preferably 0.5 to 10. When the LHSV is smaller than this range, it is undesirable because side reactions increase and the yield per unit time length is lowered. Meanwhile, if the LHSV value is too large, it is not desirable because unreacted reactants are discharged intact from the reaction system.

In the batchwise reaction, the catalyst is generally used as much as 0.1 to 10% by weight, preferably 0.5 to 5% by weight relative to the mixture of reactants. If the concentration of catalyst is lower than the above range, the reaction does not proceed. On the other hand, when the concentration of catalyst is higher than the above range, the yield of aimed product cannot always be raised but the excess quantity of catalyst results only in waste.

The quantity of the monocyclic compound such as toluene to be fed in the reaction system is 0.2 to 20, preferably 0.5 to 10, in molar ratio relative to the bicyclic compound of diphenylmethane. When the molar ratio is smaller than the above range, i.e., when the quantity of monocyclic compound relative to the dicyclic compound is smaller, the conversion rate of the raw material is low, which is not desirable. On the other hand, when an excess quantity of monocyclic compound more than the above molar ratio is used, it is not desirable either because the quantity per pass of produced dibenzylbenzene is small.

After the reaction, unreacted monocyclic compounds and unreacted dicyclic compounds are separated by an ordinary method to obtain the dibenzylbenzene of the present invention.

The electrical insulating oil of the present invention can be used for impregnating oil-filled electrical appliances. Exemplified as such appliances are oil-filled capacitors and oil-filled cables in which at least a part of their insulating materials or dielectrics are made of plastics.

The oil-filled capacitor is made by winding a metal foil such as aluminum foil as an electrode and a plastic film together to obtain a capacitor element and by impregnating it with an electrical insulating oil through a conventional method. The conventional paper can be used together with the plastics film. As the materials for the plastics film, there are polyolefins such as polyethylene, polypropylene and polymethylpentene, and polyvinylidene fluoride and polyesters. Among them, the polyolefins are especially preferable. The electrode may be formed by vacuum-deposited metal layer and such a capacitor is called as an MF capacitor. The electrical insulating oil of the present invention is especially suitable for this MF capacitor.

Furthermore, the oil-filled cable is made by winding a plastics film on a metallic conductor such as copper or aluminum and it is impregnated with an insulating oil by a conventional method. As the materials for the plastics, there are polyolefins such as polyethylene, polypropylene and polymethylpentene, and polyvinylidene fluoride and polyesters. Among them, the polyolefins are preferably used, in which insulating paper is generally used together, or a composite film made of insulating paper and polyolefin film fused or stuck to the paper or mixed fiber paper of pulp and polyolefin fiber, is used.

The insulating oil obtained in accordance with the method of the present invention has a high boiling point, however, the viscosity and pour point are relatively low. Accordingly, it can be suitably used as an electrical insulating oil. In addition, the insulating oil of the present invention can be used together with a conventionally known insulating oil or the mixture of two kinds or more in an arbitrary ratio of refined mineral oils; polyolefins such as polybutene; alkylbenzenes such as dodecylbenzene; diarylalkanes such as diphenylmethane, phenyltolylethane, phenyl-xylylethane and phenyl-isopropylphenylethane; saturated trimer of styrene; triaryldialkanes or triarylalkenes such as distyrenated xylene and dibenzyltoluene; alkylbiphenyls such as isopropylbiphenyl; alkylnaphthalenes such as diisopropylnaphthalen; and phthalic esters such as DOP.

The present invention will be described in more detail in the following.

BEST MODE FOR CARRYING OUT THE INVENTION

Example of Preparation of Catalyst

Aluminum sulfate, sulfuric acid, n-propylamine and n-propyl bromide were dissolved in water and water glass was slowly added to this solution with stirring to prepare a uniform gel-like slurry. This was fed into an autoclave and crystallized with stirring at 160° C. for 72 hours. After the crystallization, the crystals were filtered off and washing with water and filtration were repeated until the filtrate became neutral to obtain zeolite ZSM-5 having a molar ratio of $SiO_2/Al_2O_3$ of 70. The obtained zeolite was baked in the air to prepare a catalyst. The X-ray diffraction pattern was coincident with the data disclosed in the foregoing patent gazette (Japanese Patent Publication No. 46-10064). Furthermore, the above-mentioned constraint index was also identical. Therefore, it was understood that the obtained catalyst had the characteristic structure of the inlets of main pores comprising ten-membered oxygen rings.

EXAMPLE 1

The zeolite ZSM-5 prepared in the foregoing Catalyst Preparation Example was converted into hydrogen type ZSM-5 (12–14 mesh) by the ion exchange with hydrochloric acid. 200 ml of this catalyst was packed into a 250 ml reaction vessel and it was dried for 3 hours at 480° C. with the supply of dry nitrogen.

A mixture in a ratio of 2 moles of toluene and 1 mole of diphenylmethane was fed at LHSV=1.0, reaction temperature of 310° C. and pressure of 20 atm (under nitrogen atmosphere).

The obtained reaction mixture was subjected to gas chromatographic analysis to determine the compositions after certain hours' feed, the results of which are shown in the following Table 1.

EXAMPLE 2

To a 2 liter autoclave were fed 3 moles of benzene, 3 moles of benzyltoluene and 20 g of catalyst of H-ZSM-5 and allowed to react for 4 hours at 280° C. and 25 atm.

After the reaction, dibenzylbenzenes were obtained with the results of analysis of reaction mixture that the rate of reaction of benzyltoluene was 58% and the selectivity to dibenzylbenzenes was 45%.

EXAMPLE 3

Reaction was carried out in the like manner as in Example 2 except that 3 moles of benzene and 3 moles of ditolylmethane were used. After the reaction, dibenzylbenzenes were obtained with the analytical results of the reaction mixture that the rate of reaction of ditolylmethane was 61% and the selectivity to dibenzylbenzenes was 43%.

COMPARATIVE EXAMPLE 1

Hydrogen type zeolite Y (200 ml, made by Union Carbide, 12–14 mesh) was packed into a 250 ml reaction vessel and it was dried for 3 hours at 480° C. with the supply of dry nitrogen. A mixture in a ratio of 2 moles of toluene and 1 mole of diphenylmethane was fed at LHSV=1.0, reaction temperature of 180° C. and pressure of 20 atm (under nitrogen atmosphere).

The obtained reaction mixture was analyzed by gas chromatography to determine the composition after 20 hours, feed, results of which are shown in the following Table 2.

According to the results on zeolite Y, the selectivity to dibenzylbenzenes was low and the lowering of activity was severe. This lowering of activity could not be recovered by raising the reaction temperature from 180° C. to 260° C.

TABLE 1

| Time of Feed (hr) | Benzene Toluene Xylene | Diphenyl-methane | Ben-zyl-toluene | Di-tolyl-meth-ane | Tricyclic Aromatics | | |
|---|---|---|---|---|---|---|---|
| | | | | | DBB | DBT | DBX |
| 20 | 51.1 | 11.9 | 12.8 | 5.1 | 4.6 | 9.6 | 4.9 |
| 80 | 52.9 | 12.0 | 12.3 | 4.7 | 4.3 | 9.1 | 4.7 |
| 120 | 51.5 | 12.0 | 13.1 | 4.8 | 4.6 | 9.2 | 4.8 |
| 160 | 51.5 | 12.5 | 12.8 | 4.9 | 4.3 | 9.2 | 4.8 |
| 200 | 52.3 | 13.1 | 10.9 | 4.8 | 4.4 | 9.5 | 5.0 |
| 300 | 52.6 | 13.6 | 10.9 | 5.0 | 4.3 | 9.0 | 4.6 |
| 500 | 52.3 | 14.3 | 10.9 | 4.8 | 4.3 | 8.8 | 4.6 |
| 800 | 51.6 | 15.0 | 10.8 | 4.9 | 4.2 | 8.8 | 4.7 |

Note:
DBB: Dibenzylbenzne
DBT: Dibenzyltoluene
DBX: Dibenzylxylene

TABLE 2

(Comparative Example 1)

| Time of Feed (hr) | Benzene Toluene Xylene | Di-phenyl-methane | Benzyl-toluene | Di-tolyl-methane | Dibenzyl benzenes |
|---|---|---|---|---|---|
| 20 | 52.2 | 44.9 | 2.0 | 0.4 | 0.5 |

EXAMPLE 4

(Recovering of Insulating Oil)

The reaction mixture in Example 1 was recovered and benzene, toluene and xylene were removed by flash evaporation. A fraction of dibenzylbenzenes having a boiling point of 350° to 420° C. (converted to normal pressure) was obtained by reduced pressure distillation, wherein the separated crystals were filtered off.

(Preparation of Capacitor)

A vacuum metallized polypropylene film of 40 mm in width was used. One side of the film was applied by a conventional method with a vacuum deposited zinc layer leaving 3 mm margins. Capacitor elements were made by winding this metallized film and they were impregnated with the above fraction to obtain capacitors (hereinafter referred to as "Capacitor A") having a capacity of 5 μF.

For comparison, similar capacitor elements were impregnated with phenylxylylethane to obtain comparative capacitors (hereinafter referred to as "Capacitor B").

(Corona Discharge Characteristic)

According to a conventional method, the corona discharge (partial discharge) characteristics were determined at 25° C. The results are shown in Table 3. As shown in the same table, both the corona discharge characteristics of Capacitor A are higher than those of Capacitor B.

TABLE 3

| Capacitor | Corona Starting Voltage (V) | Corona Ending Voltage (V) |
|---|---|---|
| Capacitor A | 2,500 | 2,450 |
| Capacitor B | 1,020 | 890 |

(Electric Load Test)

According to a conventional method, each of Capacitor A and Capacitor B was applied with voltages of 120 V/μ in potential gradient and the change in capacity with the passage of time was measured.

As a result, the capacity of Capacitor A was hardly changed after 1000 hours. In the Capacitor B, however, the capacity was reduced by about 15% after 1000 hours.

By the way, a capacitor impregnated with benzyltoluene was also tested, in which the change in capacitor after 100 hours was similar to that of Capacitor B impregnated with phenylxylylethane.

Industrial Applicability

As described above, the present invention provides a method of producing a novel electrical insulating oil. Furthermore, the insulating oil of the present invention is most suitable for impregnating MF Capacitors.

We claim:

1. A method of producing an electrical insulating oil comprising dibenzylbenzenes which is produced by the reaction of benzene or toluene with diphenylmethane or a methyl derivative thereof at a reaction temperature of 170° to 400° C. in the presence of a synthetic crystalline zeolite catalyst having a molar ratio of $SiO_2/Al_2O_3$ of 20 or above, wherein the inlets of main pores are constituted of ten-membered oxygen rings.

2. The method as claimed in claim 1, wherein said synthetic crystalline zeolite is a ZSM-5 type catalyst.

3. The method as claimed in claim 1, wherein said ZSM-5 type catalyst is ZSM-5.

4. The method as claimed in claim 1, wherein the molar ratio of said benzene or toluene to diphenylmethane or its methyl derivative is 0.2 to 20.

5. The method as claimed in claim 1, wherein said reaction temperature is 200° to 350° C.

6. The method as claimed in claim 1, wherein said electrical insulating oil is the one used for impregnating oil-filled electrical appliances.

7. The method as claimed in claim 6, wherein said oil-filled electrical appliances are oil-filled capacitors.

8. The method as claimed in claim 7, wherein said oil-filled capacitors are oil-filled metallized plastics film capacitors.

9. An oil-filled electrical appliance which is filled with insulating oil prepared by the method as recited in claim 1.

10. The electrical appliance as claimed in claim 9, wherein said oil-filled electrical appliance is an oil-filled capacitor.

11. The electrical appliance as claimed in claim 10, wherein said oil-filled capacitor is an oil filled metallized plastic film capacitor.

* * * * *